July 8, 1930.  U. DOI  1,770,355
GAS REFRACTOMETER
Filed Oct. 22, 1927  2 Sheets-Sheet 1

Inventor
U. Doi
By Attorney Marks & Clerk

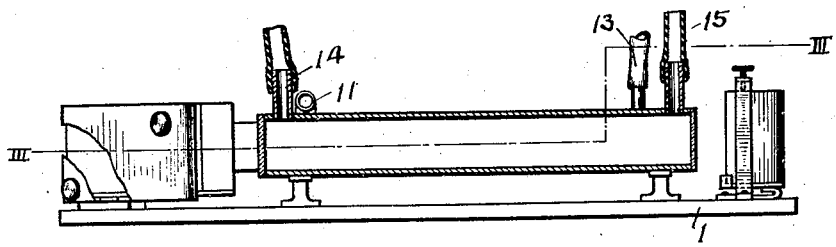
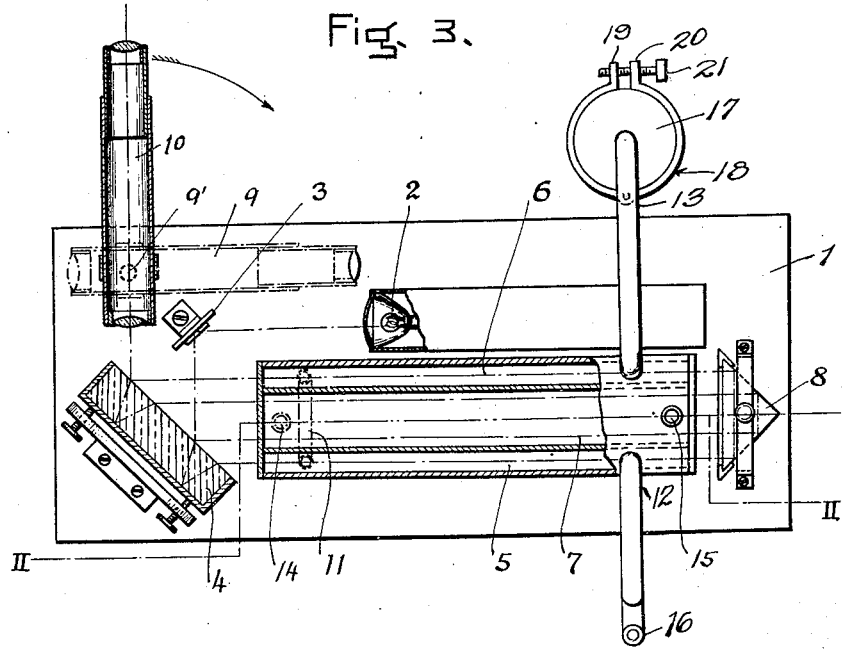

Patented July 8, 1930

1,770,355

UNITED STATES PATENT OFFICE

UZUMI DOI, OF KITATOSHIMA-GORI, JAPAN, ASSIGNOR TO ZAIDAN HOJIN RIKAGAKU KENKYUJO, OF TOKYO, JAPAN

GAS REFRACTOMETER

Application filed October 22, 1927, Serial No. 228,011, and in Japan November 6, 1926.

This invention relates to improvements in a gas refractometer and also a gas analyzer comprising in combination of the new refractometer with a means for adjusting or varying air pressure in said refractometer and a pressure gauge for indicating the air pressure. The object of the invention is to propose an improved refractometer and also an improved gas analyzer which is small in type, easy in adjustment and use, and also powerful in the refractive effect.

In the accompanying drawings:

Figs. 2 to 5 show one example of the new refractometer of portable type, and in which Fig. 2 is an elevation partly in section taken along the line II—II of Fig. 3;

Fig. 3 is a plan partly in section taken along the line III—III of Fig. 2;

Fig. 4 shows a means for varying or adjusting the air pressure of the new refractometer; and Fig. 5 shows a pressure gauge thereof.

The new refractometer is, more precisely, an improvement of Jamin's gas refractometer, one of the two parallel glass plates of which are replaced by one right-angular prism which makes the double reflection of the total ray coming from a parallel plate, so that this plate and its image by the prism act in equivalency to the two parallel glass plates. Thus, according to the invention, as the ray of light is passed in return passage, the total length of the new refractometer is reduced to one half. Also the great difficulty, which is met in the adjustment of the two glass plates in the known type into perfect parallel arrangement, is entirely eliminated, so that the present improved refractometer which is powerful in refractive effect, simple in handling and small in type will be far preferable to the hitherto used one.

Figure 1:
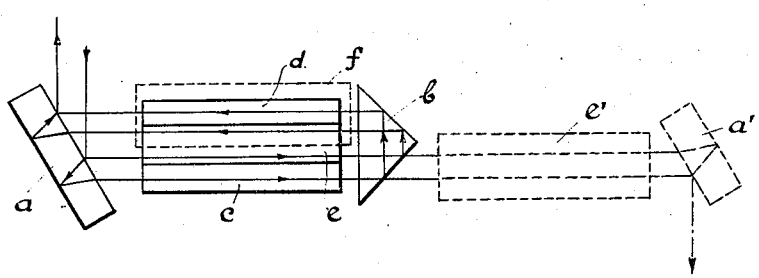
Fig. 1 is a skeleton diagram illustrating the principle of the invention.

Referring to Fig. 1, $a$ is a plane glass plate corresponding to one of the two glass plates in Jamin's refractometer, the base of which forms a reflecting mirror. $b$ is a rectangular prism. $c$ and $d$ are the air tubes. $e$ is a gas tube. The ray coming from a source of light as shown by an arrow of the downward direction is divided into two branches; the one which is directly reflected by the upper surface of the glass plate $a$, passes through the gas tube $e$ and the other which is reflected by the mirror or the base surface of the plate, passes through the air tube $c$. These two branches are twice reflected by the prism $b$ and the former returns through the same gas tube $e$ while the latter passes through the second air tube $d$. Here, the sums of the passlengths of the two branches, viz. the sum of lengths of the two air tubes and that of return length of the gas tube, are equal to each other. Therefore, the refractional interference of the new refractometer is produced only by the refractive differences between the air and the gas and in proportion to the length of their passages. Thus, when these interference fringes are observed by a proper method, the comparative refraction of the gas and air can be easily measured and accordingly the concentration etc. of the gas will be found from the results of the observation.

In Jamin's refractometer, a second glass plate $a'$ parallel to the plate $a$ is employed as shown in broken line, the parts enclosed by a rectangle $f$ of the new refractometer corresponding to the parts of a rectangle $e'$ shown in broken line. By employing the right angular prism $b$ in this invention, said part $e'$ in the known refractometer can thus be omitted and from which the following merits can be obtained.

1. In order to obtain an accurate refractional interference, the projecting and the reflecting rays must be perfectly parallel. This fact necessitates that the glass plates $a$ and $a'$ should be perfectly parallel to each other, while the top and the bottom surfaces of each of which must be also parallel. This parallel arrangement of the two plates $a$ and $a'$ are very difficult in the art of the kind. In this invention, as only one plate and one prism are employed, the plate and its image are perfectly parallel almost automatically, the adjustment of the parts for bringing out such result being very easy.

2. The light rays in Jamin's and also in other known refractometers pass a gas tube and an air tube only in one direction. In the new refractometer, they pass through them in return passages and therefore the effective lengths of the air and the gas tubes become twice those of the known type, as the result of which the length of the meter is reduced by almost one half.

3. The difficulty of the adjustment of the two glass plates into perfectly parallel arrangement in the known refractometer also necessitates to use a source of mono-chromatic light. In the new refractometer, however, the refractional spectrum can be easily produced by the white light because the two branches of the optical path can be easily brought into perfect equality, and therefore a source of light such as a pocket lamp can be employed and thus the meter can be built up as a portable type.

Figures 4, 5:
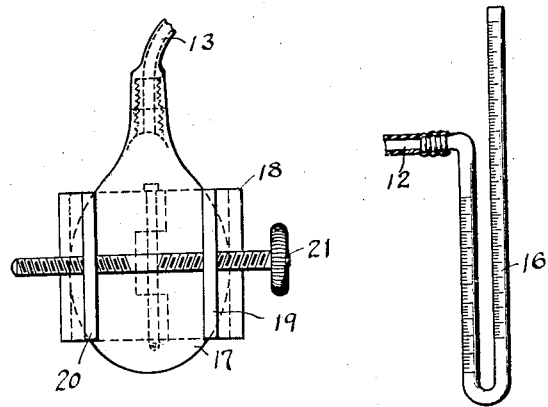

Figs. 2 to 4 show one portable example of the new refractometer constructed according to the invention. In these figures, 1 is a base. 2 is a pocket lamp employed as the source of light. 3 is a mirror reflecting the ray coming from the pocket lamp to a plane glass plate 4 which corresponds to the plate a shown in Fig. 1. 5 and 6 are the air tubes. 7 is a gas tube. 8 is a right angular prism which is adjustably fitted to a frame as to be easily understood from Figs. 2 and 3. 9 is a telescope which is pivoted at a pin shaft 9' and is brought into a position shown in full line in use from the normal position shown in dotted line. Both ends of the air tubes 5 and 6 are closed by transparent glass plates, the left ends of which are connected by a tube 11 while the right end of the tube 5 is connected to a pressure gauge 16 by a tube 12 and that of the tube 6 is communicated to a rubber bulb 17 by a tube 13. The rubber bulb 17 is provided with a means 18 for collapsing and expanding the same. This means may be any convenient type. In the example shown, it is provided with two plates 19 and 20 and a screw bolt 21. By turning the bolt head 20, the bulb is either collapsed or expanded so that the air pressure of the bulb and in turn that in the air tubes 5 and 6 are varied and this variation of the air pressure is read by the pressure gauge 16. The gas tube 7 is provided with a gas inlet pipe 14 and a gas outlet pipe 15. The whole parts are received in a convenient box.

When using the new refractometer, the so-called zero method is preferred. More fully, the gas to be tested is passed to the gas tube 7. The pocket lamp 2 is lighted and the telescope is brought into the position of use. Here, the ray is refracted to an extent according to the nature and concentration of the gas passing into the tube and the refractional spectrum produced by the refraction of the ray is directly observed by the telescope. By varying the air pressure of the bulb 17 and accordingly that of the air tubes 5 and 6 by means of 18, the position of the central fringe can be fixed to the mark of the telescope. It is understood that in this state of adjustment of the refractional spectrum the change of refraction of the ray by the air due to the variation of the air pressure and the refraction of the ray by the gas have been mutually cancelled. Therefore, from the known relation between the pressure and the refractive index of the air, the refraction of the ray by the gas can be found out and therefrom the concentration of the gas can be calculated. The relation between the pressure and the refractive index of the air, and also the relations between the refractions of the ray by various gases such as carbonic acid gas, methane, gasoline vapour, etc., and their respective concentrations can be shown by tables or the like. By this manner the concentration of the gas in the gas tube can be found out at once only by reading the indications of the pressure gauge 18.

So far the observation of the refractory spectrum is described as the so-called zero method. It is however not restricted to such special method and any other convenient or proper methods may be adopted in use of the new refractometer.

I claim:

1. A gas refractometer including a plane glass plate, a right angular prism and passages for air and gas interposed between the plate and prism, said plate being adapted to reflect a ray from a source of light through the air and gas passages on to the prism and the latter being adapted to reflect the light ray back upon the plate.

2. A gas refractometer as claimed in claim 1, characterized by the provision of means for varying air pressure in the air passage and a pressure gauge for indicating the air pressure.

In testimony whereof I affix my signature.

UZUMI DOI.